(12) United States Patent
Jackson

(10) Patent No.: US 6,248,299 B1
(45) Date of Patent: *Jun. 19, 2001

(54) OPEN SYSTEM SULFUROUS ACID GENERATOR

(76) Inventor: Edward Jackson, 3167 S. 2900 E., Salt Lake City, UT (US) 84109

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/888,376

(22) Filed: Jul. 7, 1997

(51) Int. Cl.[7] .................................................. C01B 17/48
(52) U.S. Cl. ........................ 422/161; 422/160; 422/172; 422/169; 422/189; 423/522
(58) Field of Search ..................................... 422/161, 169, 422/170, 172, 189, 160, 129, 171, 224, 225, 228; 210/192; 423/522, 532

(56) References Cited

U.S. PATENT DOCUMENTS

| | | | |
|---|---|---|---|
| 353,222 | * 11/1886 | Hughes | 422/161 |
| 1,865,607 | * 7/1932 | Allen | 422/161 |
| 3,226,201 | 12/1965 | Harmon | 422/161 |
| 3,227,201 | 1/1966 | Pokorny | 431/264 |
| 3,314,766 | 4/1967 | Mukherji | 422/119 |
| 3,337,989 | 8/1967 | Harmon | 47/58.1 |
| 3,409,409 | 11/1968 | Sackett, Sr. | 422/62 |
| 3,627,134 | 12/1971 | Mattson | 210/192 |
| 3,723,068 | 3/1973 | McBroy | 422/161 |
| 3,907,510 | 9/1975 | Collins | 422/117 |
| 4,039,289 | 8/1977 | Collins | 422/161 |
| 4,526,771 | 7/1985 | Forbush | 423/543 |
| 4,747,970 | * 5/1988 | McFarland | 261/96 |
| 4,966,757 | 10/1990 | Lewis | 422/62 |
| 5,032,373 | * 7/1991 | Jones et al. | 423/522 |

OTHER PUBLICATIONS

G.A. Cain and J.B. Chatelain, "New Low Capacity Sulphur Burner," *Chemical & Meallurgical Engineering*, vol. 46 No. 10, p 637–39, Oct. 1939.

Harmon $SO_2$ Generators: Care and Maintenance.

* cited by examiner

Primary Examiner—Shrive Beck
Assistant Examiner—Susan Ohorodnik
(74) Attorney, Agent, or Firm—Kirton & McConkie

(57) ABSTRACT

A device which generates sulphurous acid in a simplified, efficient way comprises a burn chamber for burning sulphur to produce sulphur dioxide gas, a first conduit for conducting sulphur dioxide gas produced in the burn chamber, a second conduit for conducting water, a third conduit having means for bringing sulphur dioxide gas from the first conduit and water from the second conduit into contained co-directional flow in the third conduit to create sulphurous acid, a mixing tank to receive sulphurous acid, sulphur dioxide gas and water from the third conduit, and an absorption tower and a vent conduit for reacting unreacted sulphur dioxide gas with water. The system is open meaning sulphur dioxide gas in the system is not under significant pressure as the sulphur dioxide gas is conducted through the system.

2 Claims, 5 Drawing Sheets

OPEN SYSTEM SULFUROUS ACID GENERATOR

BACKGROUND OF THE INVENTION

1. The Field of the Invention

Only a fraction of the earth's total water supply is available and suitable for agriculture, industry and domestic needs. The demand for water is great and new technologies together with growing populations increase the demand for water while pollution diminishes the limited supply of usable water. The growing demand for water requires efficient use of available water resources.

Agricultural use of water places a large demand on the world's water supply. In some communities, the water supply may be adequate for farming but the quality of the water is unsuitable for agriculture because the water is alkaline. Alkalinity is an important factor affecting the quality, efficiency and performance of soil and irrigation water. A relative increase in irrigation alkalinity due to the water's sodium to calcium ratio or a high pH renders irrigation water detrimental to soil, crop growth and irrigation water efficiency. Such water can be reclaimed for soil rehabilitation and irrigation by adding lower pH sulphurous acid to the alkaline water to reduce its alkalinity or pH.

The invention of this application is directed toward a device which generates sulphurous acid in a simplified, efficient way. In particular, it is directed toward a sulphurous acid generator which produces sulphurous acid by burning sulphur to produce sulphur dioxide gas. The sulphur dioxide gas is then drawn toward and held in contact with water eventually reacting with the water and producing sulphurous acid, while substantially reducing dangerous emissions of sulphur dioxide gas to the air.

2. The Relevant Technology

There are several sulphurous acid generators in the art. The prior art devices utilize sulphur burn chambers and absorption towers. However, all known systems utilize countercurrent current flow or pressurized systems as the principle means to accomplish the generation of sulphurous acid. For example, many devices employ the absorption tower to introduce the majority of the water to the system in countercurrent flow to the flow of sulphur dioxide gas. For example, U.S. Pat. No. 4,526,771 teaches introducing 90% of the system water for the first time in countercurrent flow at the top of the absorption tower. In such devices, the integrity of the absorption towers is vital, and any deficiencies or inefficiencies of the absorption tower lead to diminished reaction and results. Other devices utilize pressurized gas to facilitate flow of gas through the system, see U.S. Pat. No. 3,226,201. Pressurized devices, however, require expensive manufacture to ensure the containment of dangerous sulphur dioxide gas to avoid leakage. Even negative pressure machines have the drawback of requiring a source of energy to power the negative pressure generator such as an exhaust fan. Still other devices rely upon secondary combustion chambers to further oxidize the sulphur, see U.S. Pat. No. 4,526,771. Many sulphurous acid generators emit significant or dangerous levels of unreacted sulphur dioxide gas, a harmful and noxious pollutant, into the surrounding environment.

SUMMARY AND OBJECTS OF THE INVENTION

The present invention is directed to a sulphurous acid generator which can be used to improve alkaline irrigation water by adding the sulphurous acid produced by the generator to alkaline water to reduce the alkalinity and/or pH of the water. In addition to making the water less alkaline, adding sulphurous acid to alkaline water increases the availability of sulphur in the water to act as a nutrient, improves capillary action of the soil, increases cation exchange capacity, and decreases tail water run-off and tillage and fertilizer costs.

In many agricultural settings, complicated farm machinery is not practical because it requires technical training to operate and special skills to service and maintain. For sulphur generators, improved design can reduce costs, simplify operation, service and maintenance and increase efficiency and safety thereby making the machine more practical for agricultural use. The present invention is directed toward a sulphurous acid generator that is simple to produce, operate, service and maintain, and which efficiency produces, contains and reacts sulphur dioxide gas and sulphurous acid without exposing the user or other living things in proximity to the machine to dangerous sulphur dioxide emissions.

It will be appreciated that a specific energy source is not necessarily required by the present invention, and therefore its use is not necessarily restricted to locations where a particular power source, like electricity, is available or can be generated for use. All of the above objectives are met by the present invention.

Unlike the prior art, the present invention is designed to maximize the amount of water in contact with sulphur dioxide gas and the duration of the contact of water with sulphur dioxide gas without creating back pressure in the system or relying upon pressurization of the gas to cause the sulphur dioxide gas to flow through the sulphurous acid generator. This reduces the complexity of the sulphurous acid generator and the need for additional equipment such as air compressors used by prior art devices.

The invention primarily relates to a sulphur hopper, a burn chamber, a gas pipeline, a mixing tank, an absorption tower and an exhaust pipeline.

The sulphur hopper preferably has a capacity of several hundred pounds of sulphur in powder or flake form. The sulphur hopper can be constructed of various materials or combinations thereof. In the preferred embodiment, the sulphur hopper is constructed of stainless steel and plastic. The sulphur hopper is connected to the burn chamber by a passageway positioned at the base of the sulphur hopper. The conduit joins the burn chamber at its base. The weight of the sulphur in the sulphur hopper forces sulphur through the passageway at the base and into the burn chamber, providing a continual supply of sulphur for burning.

The burn chamber has an ignition inlet on the top of the burn chamber through which the sulphur is ignited and an air inlet on the side of the chamber through which oxygen enters to fuel the burning sulphur. The burning sulphur generates sulphur dioxide gas. In the preferred embodiment, the bottom of the chamber is removable, facilitating access to the chamber for maintenance and service. The burn chamber is constructed of material capable of withstanding the corrosiveness of the sulphur and the heat of combustion, preferably stainless steel.

A cooling ring is disposed around the outer perimeter of the base of the burn chamber. The cooling ring lowers the temperature of the molten sulphur near the perimeter of the base of the burn chamber, creating a semi-solid ring of sulphur along the perimeter of the chamber and preventing molten sulphur and sulphur dioxide gas from leaking out of the base of the burn chamber. In the preferred embodiment, the cooling mechanism is a metallic ring through which cool water passes. The ring is connected to the base of the burn chamber, running along the perimeter of the base.

Sulphur dioxide gas exits the burn chamber through an exhaust outlet on the top of the burn chamber and is drawn into a first conduit. The first conduit may be manufactured from stainless steel.

A supply of water is brought to the gas pipeline by a second conduit and may be brought from a water source through the second conduit by any means capable of delivering sufficient water and pressure, such as an elevated water tank or a mechanical or electric pump.

The first conduit and second conduit meet and couple with a third conduit. The third conduit comprises a blending portion, a contact containment portion, an agitation portion and a means for discharging the sulphurous acid and unreacted sulphur dioxide gas. The third conduit may be constructed of polyethylene plastic.

The blending portion of the third conduit comprises a means for bringing the sulphur dioxide gas in the first conduit and substantially all the water in the second conduit into contained, condirectional flow into contact with each other. The majority of water used to create sulphurous acid is introduced into the third conduit and flows through one or more contact containment and agitation portions in the third conduit, discharging naturally into a mixing tank.

As the water is introduced into the third conduit in co-directional flow with the sulphur dioxide gas the water is introduced so as to create an annular column of water with the sulphur dioxide gas flowing inside the annular column of water thereby blending the water and sulphur dioxide gas together. In the preferred embodiment, water is introduced into the gas pipeline passes through an adductor, which causes sulphur dioxide gas to be drawn through the first conduit without the need of pressuring the sulphur dioxide gas and without using an exhaust fan. The water and sulphur dioxide gas remain in contact with each other for the period of time it takes to flow through a portion of the third conduit. In the contact area, a portion of the sulphur dioxide gas reacts with the water, creating sulphurous acid.

The agitation portion comprises a means for mixing and agitating the codirectionally flowing sulphur dioxide gas and water/sulphurous acid. The agitation portions enhance sulphur dioxide gas reaction and dispersion. Bends in the third conduit or obstructions within the third conduit are contemplated as possible means for mixing and agitating in the agitation portion. Agitation of the co-directional flow of the sulphur dioxide gas and water further facilitates reaction of the sulphur dioxide gas with water. Sulphurous acid and sulphur dioxide gas flow out of the third conduit through the means for discharging the sulphurous acid and unreacted sulphur dioxide gas. A discharge outlet represents a possible embodiment of means for discharging the sulphurous acid and unreacted sulphur dioxide gas.

The sulphurous acid and unreacted sulphur dioxide gas exit the third conduit through the discharge and enter a mixing tank. A weir divides the mixing tank into two sections, namely a pooling section and an effluent or outlet section. Sulphurous acid and sulphur dioxide gas exit the discharge of the third conduit into the pooling section. As the sulphurous acid continues to pour into the mixing tank, the level of the sulphurous acid in the pooling section rises, creating a pool of sulphurous acid equal in depth to the height of the weir. At all time, the sulphurous acid and unreacted sulphur dioxide gas discharge from the third conduit above the level of the fluid in the pooling section of the mixing tank.

In other words, the discharge from the third conduit is positioned suficiently above the surface of the pool, so that sulphur dioxide gas exiting the pipeline can pass directly into and be submerged within the pool while in an open (nonclosed) arrangement. In other words, the discharge from the third conduit does not create any significant back pressure on the flow of sulphurous acid or sulphur dioxide gas in the third conduit or gas pipeline. The position of the discharge from the third conduit reduces the likelihood that the unreacted sulphur dioxide gas will exit from the discharge without being submerged in the pool. The discharge is removed a distance from the sidewall of the mixing tank toward the center of the pooling section to allow the pool to be efficiently churned by the inflow of sulphurous acid and unreacted sulphur dioxide gas from the third conduit.

As acidic water and gas continue to enter the tank from the third conduit, the level of the pool eventually exceeds the height of the weir. Sulphurous acid spills over the weir and into the effluent or outlet section of the mixing tank where the sulphurous acid exits the mixing tank through an effluent outlet. The top of the effluent outlet is positioned below height of the weir and the discharge from the third conduit to reduce the amount of free floating unreacted sulphur dioxide gas exiting the chamber through the effluent outlet.

Free floating, unreacted sulphur dioxide gas remaining in the mixing tank rises up to the top of the mixing tank. The top of the mixing tank is adapted with a grill defining holes. Sulphur dioxide gas passes through the holes of the grill and enters an absorption tower located above the mixing tank.

In its preferred embodiment the absorption tower has a cylindrical body and is constructed of polyethylene plastic which is durable, lightweight and resistant to ultra violet ray degradation. At the top of the absorption tower, a water emitter inside the tower sprays water downwards, resulting in a countercurrent flow of rising sulphur dioxide gas and descending water. The rising sulphur dioxide gas comes into countercurrent contact with the descending water, creating sulphurous acid.

The absorption tower is packed with path diverters, which force the countercurrent flow of sulphur dioxide gas and water to pass through a tortuous maze, increasing the duration of time the gas and water remain in contact and the surface area of the contact. Substantially all the free floating sulphur dioxide gas from the mixing tank will react with water in the tower to form sulphurous acid. Sulphurous acid created in the tower flows down into the mixing tank. Any excess sulphur dioxide gas which is not reacted with water emitted in the tower rises and passes through a demister pad. The sulphur dioxide gas exits through an exhaust vent in the top of the tower.

To ensure further elimination of any significant emissions of sulphur dioxide gas from the generator into the environment, the sulphur dioxide gas may be drawn into an exhaust conduit coupled with the exhaust vent on the lid of the tower. The exhaust conduit defines a fourth conduit. Positioned in the fourth conduit is a means for introducing water into the fourth conduit. The water which enters the fourth conduit may be brought from a water source by any means capable of delivering sufficient water to the fourth conduit. As the water is introduced into the fourth conduit, it reacts with the trace amounts of sulphur dioxide gas that have migrated out of the absorption tower, and creates sulphurous acid.

In the preferred embodiment, water introduced into the fourth conduit, passes through an adductor causing the sulphur dioxide gas to be drawn through the vent and into the fourth conduit. The gas and liquid remain in contact as they move through one or more contact containment and/or agitation portions of the fourth conduit before being discharged for use. The exhaust vent and fourth conduit ensure that substantially all the sulphur dioxide gas produced will be converted to sulphurous acid.

High density polyethylene plastic is preferred for its durability and resistance to ultra violet ray degradation.

As mentioned, the water introduced into the system to the third conduit, fourth conduit, cooling ring, and the absorption tower emitter may be brought from a water source to the system by any means capable of delivering sufficient water and pressure, such as a standing, elevated water tank, or mechanical, electric or diesel powered water pump.

It is an object of this invention to create a sulfurous acid generator that is simple to manufacture, use, maintain and service.

It is further an object of this invention to create a sulfurous acid generator that is capable of operating without any electrical equipment such as pumps, air compressor or exhaust fans requiring a specific energy source requirement, such as electricity or diesel fuels.

It is another object of this invention to produce a sulphurous acid generator which converts substantially all sulfur dioxide gas generated into sulphurous acid.

It is another object of the invention to produce a sulfurous acid generator which uses an induced draw created by the flow of water through the system to draw gases through the otherwise open system.

Another object of the present invention is to provide a sulphurous acid generator with one or more contact containment and/or agitation and mixing mechanisms to increase the duration of time during which the sulphur dioxide gas is in contact with and mixed with water.

It is an object of this invention to produce a sulphurous acid generator which substantially eliminates emission of harmful sulphur dioxide gas.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
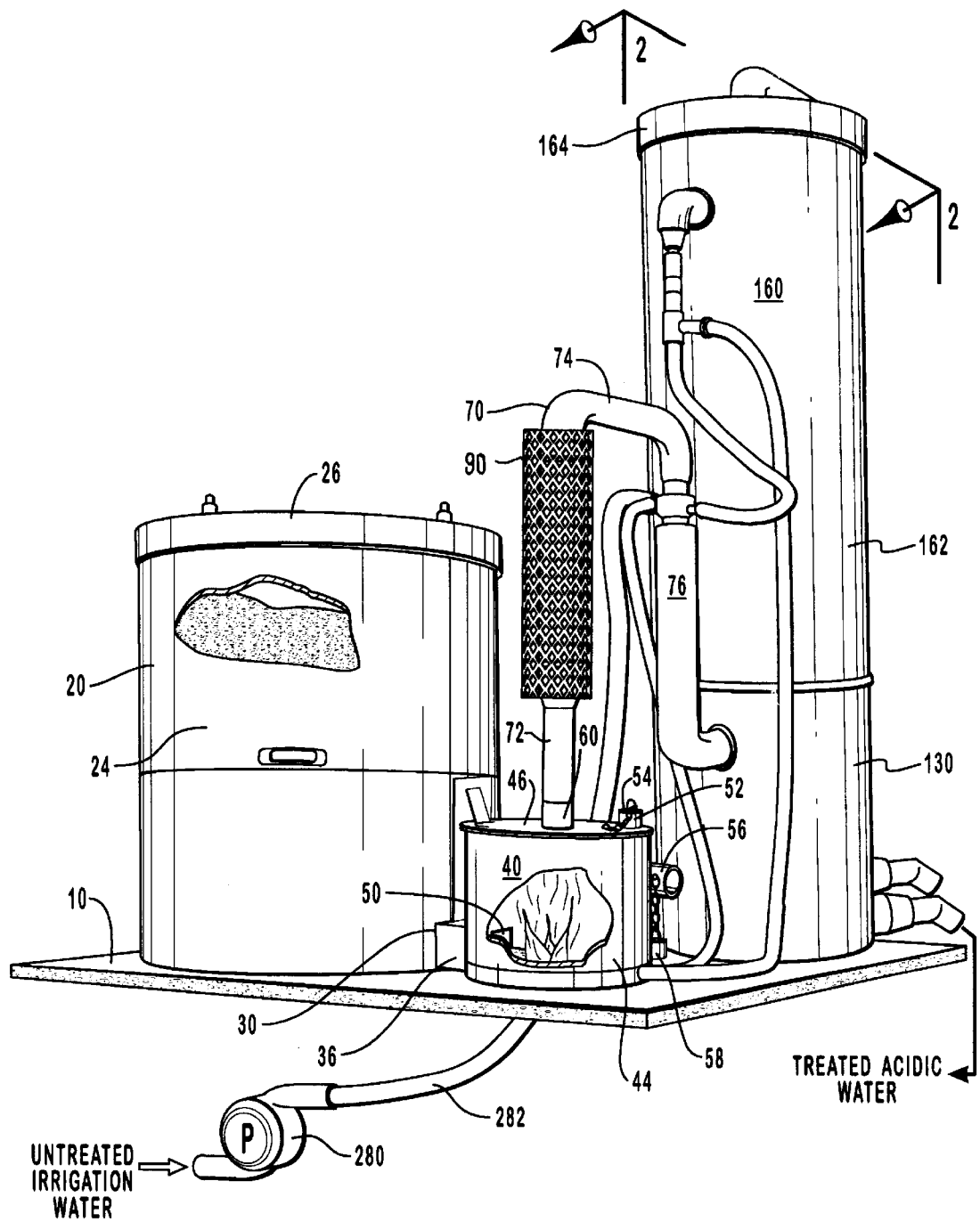
FIG. 1 is a perspective view of one embodiment of the sulphurous acid generator.
Figure 2:
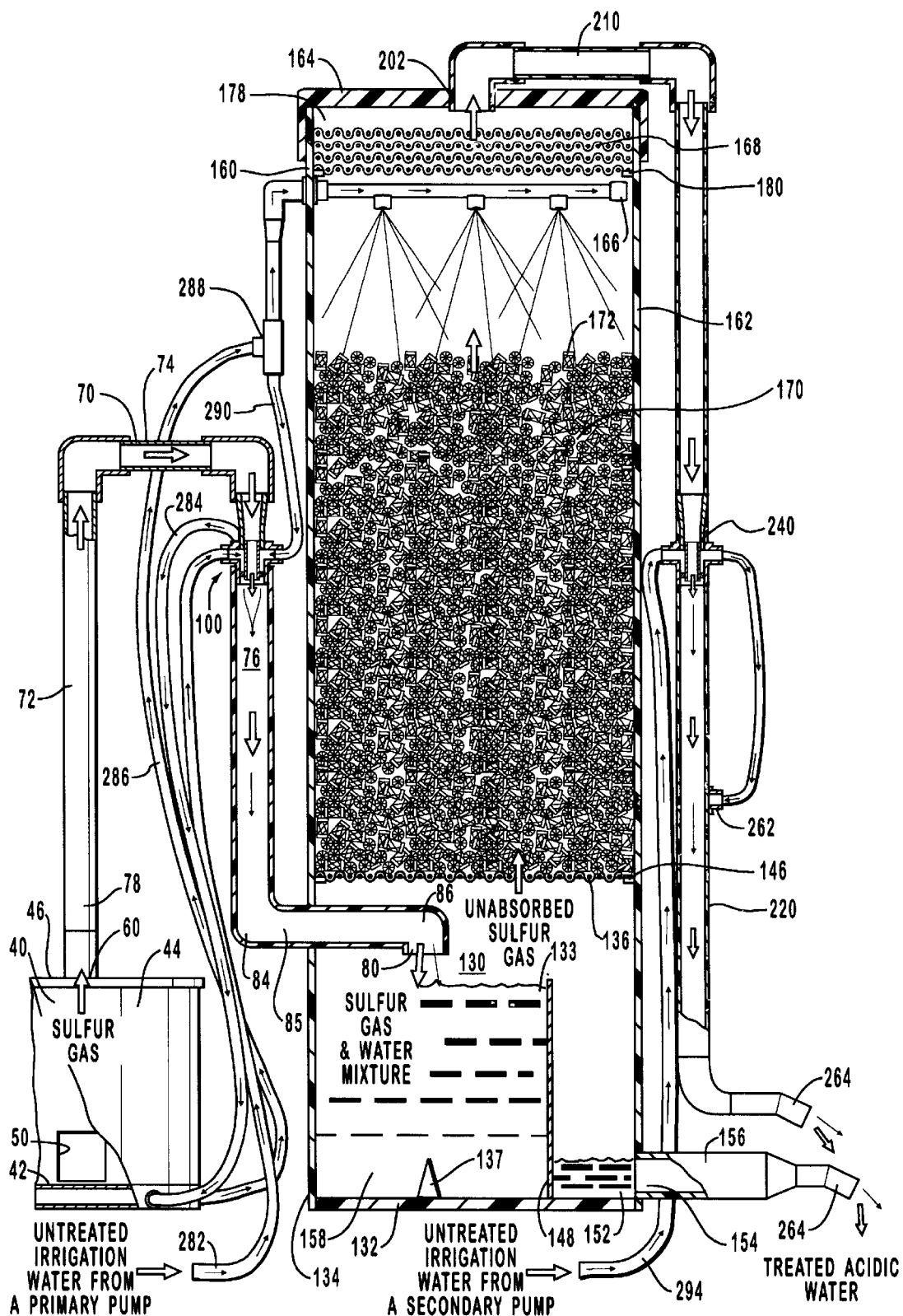
FIG. 2 is a side elevation view partly in cutaway cross-section of the components of the sulphurous acid generator.

Including by reference the figures listed above, applicant's sulfurous acid generator comprises a system which generates sulphur dioxide gas and keeps the gas substantially contained and in contact with water for extended periods of time substantially, eliminating any significant release of harmful sulphur dioxide gas from the system. As shown in FIGS. 1 and 2, the principle elements comprise a sulphur hopper 20, a burn chamber 40, a gas pipeline 70, a mixing tank 130, an absorption tower 160 and an exhaust conduit 210. The principle elements are mounted on a platform 10 to facilitate transport.

The sulphur hopper 20 comprises enclosure 24 with a top surface 26. The top surface 26 defines a closeable aperture, not shown. The closeable aperture is of sufficient diameter and shape to allow sulphur to be loaded into the hopper 20. The enclosure 24 defines a hopper outlet 30. The hopper 20 is configured such that sulphur in the hopper 20 is directed toward the hopper outlet 30 by the pull of gravity. The hopper outlet 30 allows sulphur to pass through and out of the hopper 20.

A passageway conduit 36 communicates between the hopper outlet 30 a burn chamber inlet 50 of the burn chamber 40.

The burn chamber 40 comprises a floor member 42, a cylindrical chamber sidewall 44 and a roof member 46. The floor member 42 defines a perimeter and the floor member 42 is removably attached to the cylindrical chamber sidewall 44. The roof member 46 is secured to the chamber sidewall 44, the chamber sidewall 44 supporting the roof member 46. An ignition inlet 52 defined by the roof member 46 has a removably attached ignition inlet cover 54. An air inlet 56 defined by the chamber sidewall 44 has a removably attached air inlet cover 58. The air inlet 56 is positioned substantially opposite to the conduit inlet 50 and enters the chamber sidewall 44 tangentially. A cooling ring, not shown, surrounds the burn chamber 40 about its perimeter. An exhaust opening 60 in the burn chamber 40 is defined by the roof member 46.

Sulphur supplied to the burn chamber 40 through the conduit inlet 50 can be ignited through the ignition inlet 52. The air inlet 56 allows oxygen, necessary for the combustion process, to enter into the burn chamber 40 and thus permits regulation of the rate of combustion. The exhaust opening 60 allows the sulphur dioxide gas to pass up through the exhaust opening 60 and into the gas pipeline 70.

The gas pipeline 70 has two ends, the first end 78 communicating with the exhaust opening 60, the second end terminating at a third conduit 76. The gas pipeline or first conduit 70 may comprise an ascending pipe 72 and a transverse pipe 74. The ascending pipe 72 may communicate with the transverse pipe 74 by means a first 90 degree elbow joint. Disposed about and secured to the ascending pipe 72 is a protective grate 90 to prevent unintended external contact with member 72 which is hot when in use.

Water is conducted through a second conduit 282 to a point at which the second conduit 282 couples with the first conduit 70 at a third conduit 76.

Conduit 76 comprises a means 100 for bringing the sulphur dioxide gas in the first conduit and substantially all the water in the second conduit into contained codirectional flow whereby the sulphur dioxide gas and water are brought into contact with each other.

Figure 3:
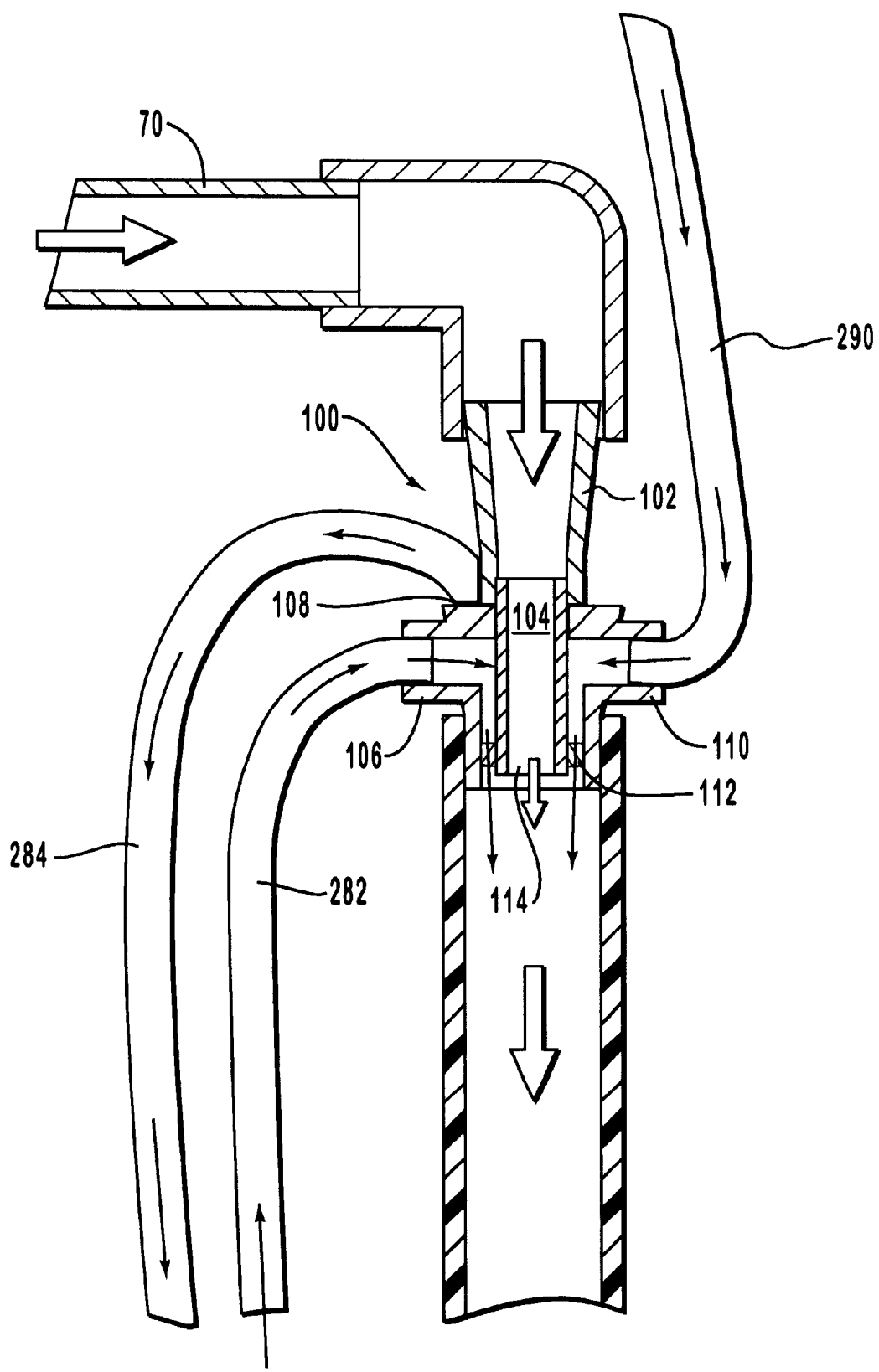
FIG. 3 is an enlarged view of a portion of a third conduit.

The codirectional flow means 100 shown in FIGS. 2 and 3, comprises a central body 102, the central body defining a gas entry 104 and a sulfur dioxide gas exiting outlet 114, the central body comprising a secondary conduit inlet 106, a cooling ring outlet 108, an emitter return inlet 110, and a gas adductor 112. The adductor 112 generates an annular column of water to encircle gas exiting outlet 114. The water flow, thermal cooling and reaction are believed to draw sulphur dioxide gas from the burn chamber 40 into the gas pipeline 70 where the gas is brought into contact with water to create sulphurous acid.

The codirection flow means 100 allows water to be introduced into the third conduit 76 initially through a second conduit inlet 106. A small portion of the water then exits codirectional means 100 through the cooling ring outlet 108 and is diverted into a cooling ring hose 284 to the cooling ring. The cooling ring cools the perimeter of the burn chamber 40 which prevents sulphur dioxide gas from leaking out near the removably attached floor member 42 of the burn chamber 40. Water exits the cooling ring into an emitter feed-hose 286 running to the absorption tower 160. Substantially all of the water entering the codirectional means 100 passes through the adductor 112 and, exits adjacent the sulphur dioxide gas outlet 114. The water enters the third conduit 76 and comes into contact with the sulphur dioxide gas where the sulphur dioxide gas and water are contained in contact with each other. The water and sulphur dioxide gas react to form an acid of sulphur. This first contact containment portion of conduit 76 does not obstruct the flow of the sulphur dioxide gas. It is believed that a substantial portion of the sulphur dioxide gas will react with the water in this first contact containment area.

After the acid (and any host water hereafter "water/acid") and any remaining unreacted gas continue to flow through third conduit 76, the water/acid and unreacted sulphur dioxide gas are mixed and agitated to further facilitate reaction of the sulphur dioxide with the water/acid. Means for mixing and agitating the flow of water/acid and sulphur dioxide gas is accomplished in a number of ways. For example, as shown in FIG. 2, mixing and agitating can be accomplished by changing the direction of the flow such as a bend 84 in the third conduit 76. Another example, not shown, includes placing an object inside the third conduit 76 to alter the flow pattern in the third conduit 76. This could entail a flow altering wedge, flange, bump or other member along the codirectional flow path in third conduit 76. By placing an object in the flow path, a straight or substantially straight conduit may be employed. The distinction of this invention over the prior art is mixing and agitating the flow of water/acid and sulphur dioxide involving substantially all of the water of the system with sulphur dioxide gas in an open codirectionally flowing system. One embodiment of the present invention employed over 300 gallons of water per minute coursing through third conduit 76 being held in contained contact with the sulphur dioxide gas.

After the water/acid and sulphur dioxide gas have passed through an agitation and mixing portion of third conduit 76, the water/acid and unreacted sulphur dioxide gas are again contained in contact with each other to further facilitate reaction between the components to create an acid of sulphur. This is accomplished by means for containing the water/acid and sulphur dioxide gas in contact with each other. One embodiment is shown in FIG. 2 as a portion 85 of third conduit 76. Portion 85 acts much in the same way as the earlier described contact containment portion.

In a preferred embodiment, additional means for mixing and agitating the codirectional flow of water/acid and sulphur dioxide gas is employed. One embodiment is illustrated as portion 86 of third conduit 76 in which again the directional flow of the water/acid and sulphur dioxide gas is directionally altered. In this way, the water/acid and sulphur dioxide gas are forced to mix and agitate, further facilitating reaction of the sulphur dioxide gas to further produce or concentrate an acid of sulphur.

Third conduit 76 also incorporates means for discharging the water/acid and unreacted sulphur dioxide gas. One embodiment is shown in FIG. 2 as discharge opening 80 defined by third conduit 76. Discharge opening 80 is preferably positioned approximately in the center of the pooling section, described below. In the preferred embodiment, discharge 80 is configured so as to direct the discharge of water/acid and unreacted sulphur dioxide gas downward into a submersion pool 158.

The present invention also utilizes a tank 130 having a bottom 132, a tank sidewall 134, and a grill top 136. Tank 130 may also comprise a fluid dispersion member 137 to disperse churning sulphurous acid and sulphur dioxide gas throughout tank 130. Dispersion member 137 may have a conical shape or any other shape which facilitates dispersion. A plurality of brackets 146 attached to the tank sidewall 134 support the grill top 136. A weir 148 is attached on one side to the bottom member 132 and is attached on two sides to the tank sidewall 134. The weir 148 extends upwardly to a distance stopping below the discharge 74. The weir 148 divides the mixing tank 130 into a submersion pool 158 and an outlet section 152. Preferably, the third conduit 76 penetrates the tank sidewall 134 at a point below the grill top 136. An outlet aperture 154 is positioned in the tank sidewall 134 near the bottom member 132 in the discharge section. The drainage aperture 154 is connected to a drainage pipe 156.

As sulphurous acid flows out of the third conduit 76, the weir 148 dams the acid coming into the mixing tank 130 creating a churning submersion pool 158 of sulphurous acid. Sulphur dioxide gas carried by but not yet reacted in the sulphurous acid is carried into submersion pool of acid 158 because of the proximity of the discharge 80 to the surface 133 of the pool 158. The carried gas is submerged in the churning submersion pool 158. The suspended gas is momentarily churned in contact with acid in pool 158 to further concentrate the acid. As unreacted gas rises up through the pool, the unreacted gas is held in contact with water and further reacts to further form concentrate sulphurous acid. The combination of the discharge 80 and its close proximity to the surface 133 of pool of acid 158 creates a means for facilitating and maintaining the submersion of unreacted sulphur dioxide gas discharged from the third conduit into the submersion pool of sulphurous acid to substantially reduce the separation of unreacted sulphur dioxide gas from contact with the sulphurous acid to promote further reaction of the sulphur dioxide gas in the sulphurous acid in an open system without subjecting the sulphur dioxide gas discharged from the third conduit to back pressure or system pressure. That is, discharge 80 below the level of the top of weir 148 is contemplated as inconsistent with an open system.

As sulphurous acid enters the mixing tank 130 from the third conduit 76 the level of the pool 132 of sulphurous acid rises until the acid spills over the weir 148 into the outlet section 152. Sulphurous acid flows out of the mixing tank 130 through the drainage pipe 156 to mix with alkaline irrigation water to lower the alkalinity of the irrigation water.

Any free floating sulphur dioxide gas in mixing tank 130 rises up to and passes through the grill top 136 and enters absorption tower 160. Absorption tower 160 is comprised of a body 162, a lid 164, an emitter 166, a demister pad 168, and a plurality of path diverters 170. The body 162 defines a top aperture 178. The body 162 is positioned above tank 130. The emitter 166 enters the body 162 at a point below the aperture 178 of the absorption tower 160 and is secured to the body 162. On the interior surface of the body 162, a plurality of pad supports 180 are attached at an elevation above emitter 166. The pad supports 180 hold up the demister pad 168. The path diverters 170 fill the absorption tower 160 to a point below the water emitter 166. In the preferred embodiment the path diverters are Flexirings® 172. The lid 164 completely covers the top aperture 178 defined by the body 162. The lid 164 defines an exhaust vent 202.

Sulphur dioxide enters the absorption tower 160 from the mixing tank 130, and the gas rises up through the path diverters 170. Water sprayed down from the emitter 166 in countercurrent flow against the rising sulphur dioxide gas. The countercurrent water covers the path diverters 170. The path diverters 170 create a tortuous maze which impedes the flow of the sulphur dioxide gas as it travels up through the tower 160. The impeded flow of sulphur dioxide gas increases the likelihood that the gas will come into contact with water on the surfaces of the path diverters 170. The impeded flow of gas also allows the gas to remain in contact with water for a longer period of time. Sulphurous acid produced in the tower 160 flows down into the mixing tank 130.

The demister pad 168 acts as a condenser, separating liquid from vapor passing out of the absorption tower 160.

Exhaust vent 202 may be coupled with a vent conduit 210. The vent conduit 210 has a first end which couples with the exhaust vent 202 and a second end which terminates at a fourth conduit 220. The vent conduit 210 may consist of a length a pipe between vent 202 and the fourth conduit 220. The fourth conduit 220 comprises auxiliary means 240 for bringing sulphur dioxide gas in the vent conduit and substantially all the water in the supplemental water conduit into contained, codirectional flow whereby the sulphur dioxide gas and water are brought into contact with each other.

Figure 4:
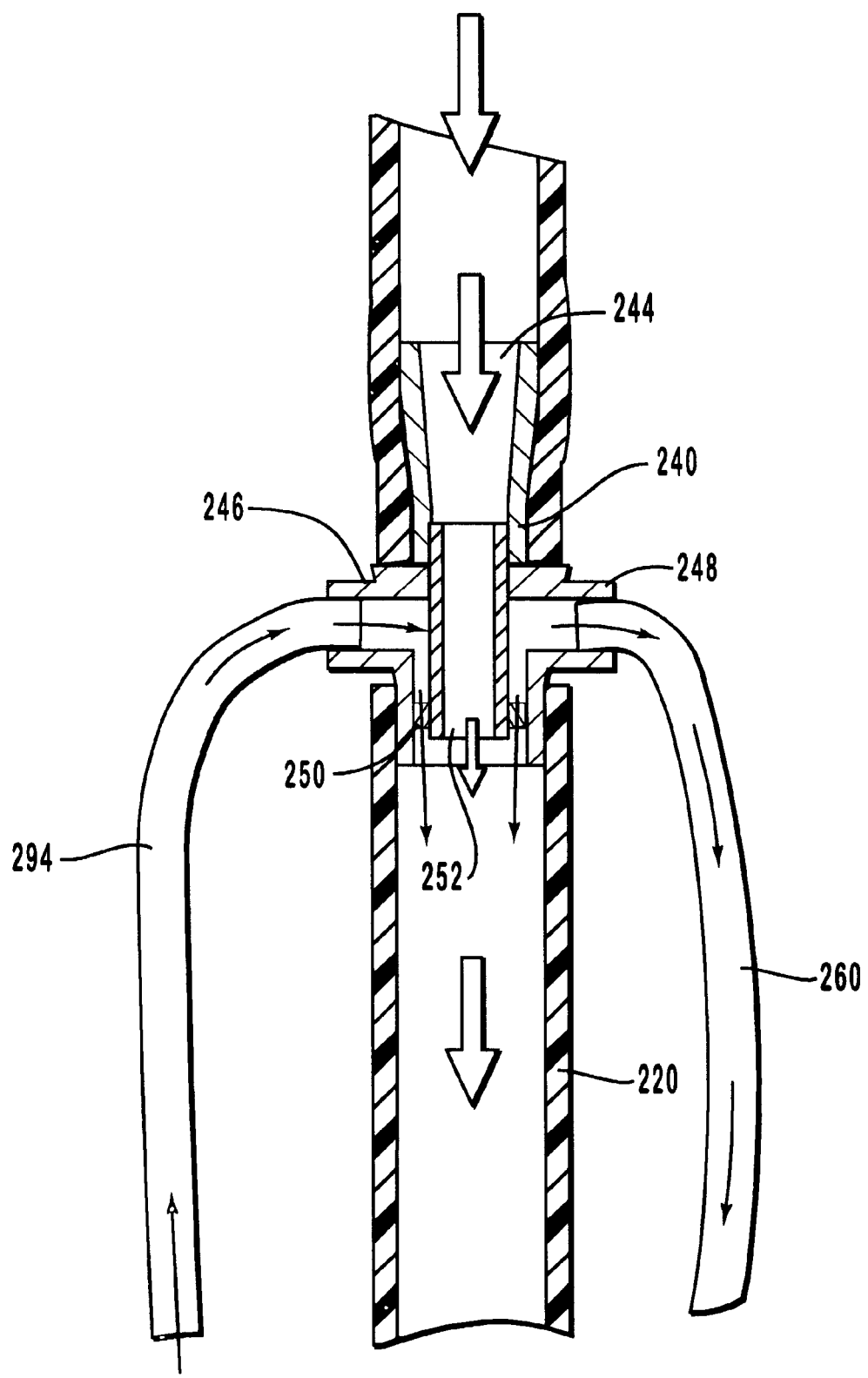
FIG. 4 is an enlarged view of a portion of a fourth conduit.
Figure 5:
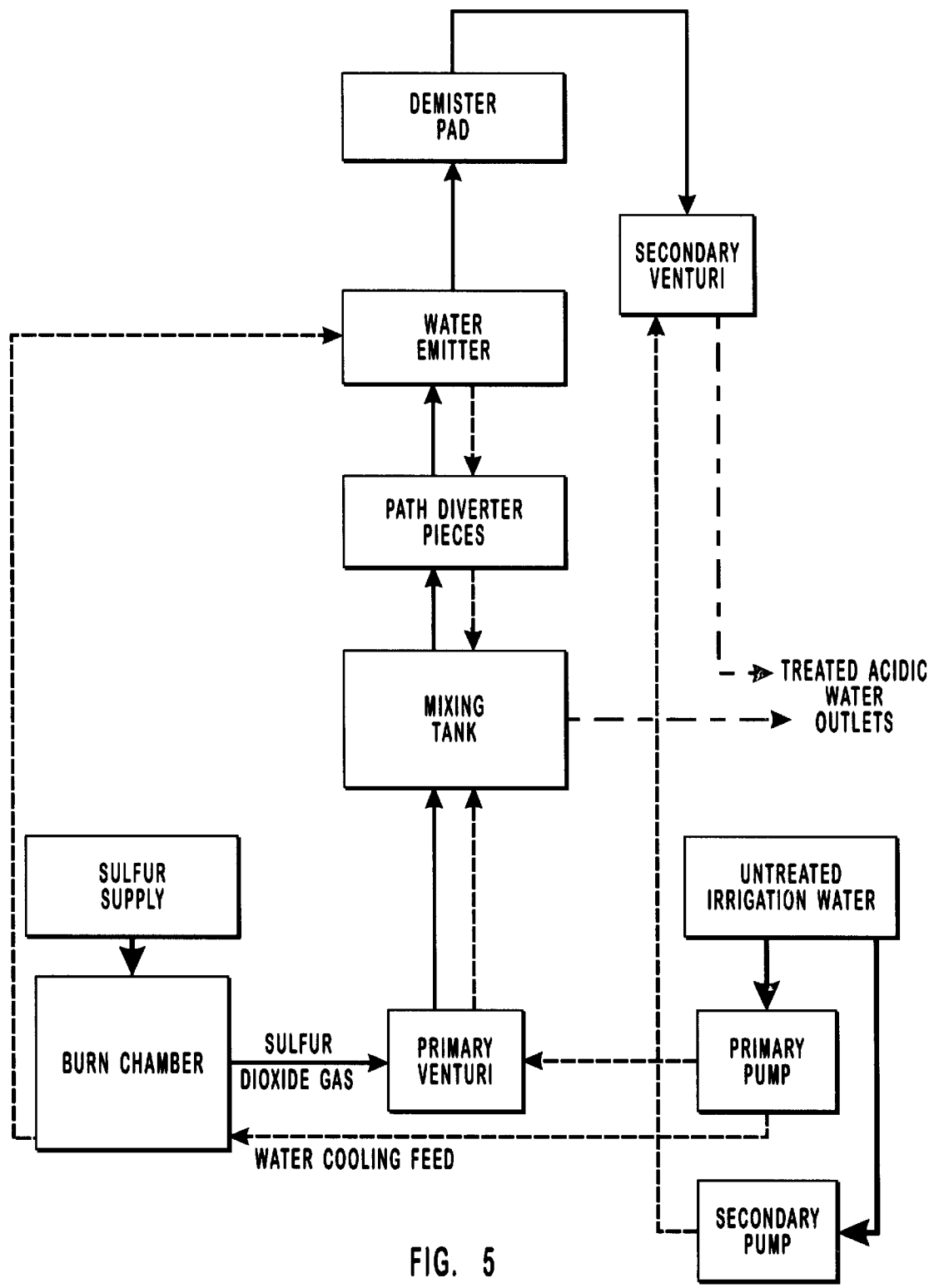
FIG. 5 is a flow chart explaining the inventive process.

As shown in FIGS. 2 and 4, the auxiliary means has a body 240 defining a gas entry 244, a gas outlet 252, a supplemental water conduit inlet 246, a bleed-off outlet 248, and water adductor 250. A bleed-off hose 260 is attached to the bleed-off outlet 248 and reenters the fourth conduit 220 at inlet 262 below the auxiliary means 240. A small portion of the supplemental water courses through hose 260.

Water enters the auxiliary means 240 through the supplemental water conduit 294 at inlet 246. The water courses through the adductor as discussed earlier as to the codirectional means. The water adductor 250 draws any free floating sulphur dioxide gas into the exhaust vent conduit 210. Water and sulphur dioxide gas are brought into contact with each other in fourth conduit 220. The water and gas are contained in contact with each other as the gas and water flow down through fourth conduit 220 to react and form an acid of sulphur. This contact containment area does not obstruct the flow of the sulphur dioxide gas. Substantially all of the sulphur dioxide gas in vent conduit 210 will react with the water in this contact containment area.

In fourth conduit 220, the water/acid and unreacted or undissolved sulphur dioxide gas also experience one or more agitation and mixing episodes. For example, as water reenters fourth conduit 220 at inlet 262, the flow of water/acid and sulphur dioxide gas is mixed and agitated. The water/acid and sulphur dioxide gas are again contained in contact with each other thereafter. Another similar mixing and agitating episode occurs when the directional flow of the water/acid and sulphur dioxide gas is altered near discharge 264. As a result, like the water/acid and sulphur dioxide gas in the third conduit 76, the water/acid and sulphur dioxide gas in fourth conduit 220 may be subject to one or more contact containment portions and on or move agitation and mixing portions.

FIGS. 1, 2 and 3 show a primary pump 280 supplying water through a primary hose 282 to the secondary conduit water inlet 106 at codirectional means 100. FIG. 2 shows water being diverted inside the codirectional means 100 leaving through the cooling ring outlet 108 and entering a cooling ring hose 284. The cooling ring hose 284 is attached to the cooling ring not shown through which the water passes. Water then exits the cooling ring and enters an emitter feed-hose 286 attached to the cooling ring. The emitter feed-hose 286 is connected to a T joint 288. Water is diverted at the T joint 288 into the water emitter 166 or into an emitter return hose 290, which returns the water to the codirectional means 100 through the emitter return inlet 110.

In FIG. 2, a supplemental or secondary pump supplies water to auxiliary means 240 through a supplemental water conduit hose 294.

It will be appreciated that any pump capable of delivering sufficient water to the system may be utilized and the pump may be powered by any source sufficient to run the pump. A single pump with the appropriate valving may be used or several pumps may be used. It is also contemplated that no pump is necessary at all if an elevated water tank is employed to provide sufficient water flow to the system.

Testing of embodiments of this invention have revealed that sulphur dioxide emissions exiting exhaust vent 202 have been reduced to a range of 30–150 parts per million.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letter Patent is:

1. A sulphurous acid generator comprising:
    a supply of sulphur dioxide gas conducted in a first conduit and means for drawing the sulphur dioxide gas through the first conduit;
    a supply of water conducted in a second conduit;
    a third conduit coupled to the first and second conduits comprising:
        a blending portion, at least one contact containment portion, and at least one agitation portion,
            the blending portion comprising means for bringing the sulphur dioxide gas in the first conduit and water from the second conduit into contained, codirectional flow whereby the sulphur dioxide gas and water are brought into contact with each other,
            the contact containment portion(s) comprising a passageway through which the sulphur dioxide gas and the water codirectionally flow in contact with each other and in which at least a portion of the sulphur dioxide gas reacts with water to form sulphurous acid,
            the agitation portion(s) comprising means for mixing and agitating the codirectionally flowing sulphur dioxide gas and water/sulphurous acid to facilitate the reaction and dispersement of sulphur dioxide gas with the water/sulphurous acid, and
            means for discharging the sulphurous acid and unreacted sulphur dioxide gas, the discharge means in communication with ambient pressure, the first and third conduits defining an apparatus open to ambient pressure;
    a mixing tank into which the sulphurous acid and unreacted sulphur dioxide are discharged from the third conduit, the mixing tank temporarily retaining the discharged sulphurous acid in a submersion pool;
    means for facilitating and maintaining the submersion of unreacted sulphur dioxide gas discharged from the third conduit into the submersion pool of sulphurous acid to substantially reduce the separation of unreacted sulphur dioxide gas from contact with the sulphurous acid to promote further reaction of the sulphur dioxide gas into the sulphurous acid;
    the mixing tank defining an outlet subject to ambient pressure through which the sulphurous acid may pass to exit the mixing tank;
    the mixing tank, the facilitating and maintaining means, and the outlet defining an open system thereby avoiding subjecting the sulphur dioxide gas to a system pressure;
    an absorption tower in communication with the mixing tank into which free floating unreacted sulphur dioxide gas passes from the mixing tank, the absorption tower comprising means for creating a flow of water countercurrent to the flow of sulphur dioxide gas, the tower containing a tortuous maze of pathways through which the water and sulphur dioxide gas will pass in countercurrent flow, and in which sulphur dioxide gas and water come into contact to form sulphurous acid, the absorption tower having an exhaust vent through which sulphur dioxide not reacted in the tower may pass;
    a supply of unreacted sulphur dioxide gas conducted in a vent conduit in communication with the exhaust vent and means for drawing the sulphur dioxide gas through the vent conduit;
    a supply of water conducted in a supplemental water conduit;
    a fourth conduit comprising:
        a blending portion, at least one contact containment portion, and at least one agitation portion;
            the blending portion comprising means for bringing the sulphur dioxide gas in the vent conduit and water from the supplemental water conduit into contained, codirectional flow whereby the sulphur dioxide gas and water are brought into contact with each other,
            the contact containment portion(s) comprising a passageway through which the sulphur dioxide gas and the water codirectionally flow in contact with each other and in which at least a portion of the sulphur dioxide gas reacts with the water to form sulphurous acid,
            the agitation portion(s) comprising means for mixing and agitating the codirectionally flowing sulphur dioxide gas and water/sulphurous acid to facilitate the reaction and dispersement of sulphur dioxide gas into the water/sulphurous acid, and
            means for discharging the sulphurous acid and any unreacted sulphur dioxide gas.

2. A sulphurous acid generator comprising:
    a supply of sulphur dioxide gas conducted in a first conduit and means for drawing the sulphur dioxide gas through the first conduit;
    a supply of water conducted in a second conduit;
    a third conduit coupled to the first and second conduits comprising:
        a blending portion and at least one contact containment portion;
            the blending portion comprising means for bringing the sulphur dioxide gas in the first conduit and water from the second conduit into contained, codirectional flow whereby the sulphur dioxide gas and water are brought into contact with each other,
            the contact containment portion(s) comprising a passageway through which the sulphur dioxide gas and the water codirectionally flow in contact with each other and in which at least a portion of the sulphur dioxide gas reacts with water to form sulphurous acid, and
            means for discharging the sulphurous acid and unreacted sulphur dioxide gas, the discharge means in communication with ambient pressure, the first and third conduits defining an apparatus open to ambient pressure;

a mixing tank into which the sulphurous acid and unreacted sulphur dioxide are discharged from the third conduit, the mixing tank temporarily retaining the discharged sulphurous acid in a submersion pool;

means for facilitating and maintaining the submersion of unreacted sulphur dioxide gas discharged from the third conduit into the submersion pool of sulphurous acid to substantially reduce the separation of unreacted sulphur dioxide gas from contact with the sulphurous acid to promote further reaction of the sulphur dioxide gas into the sulphurous acid;

the mixing tank defining an outlet subject to ambient pressure through which the sulphurous acid may pass to exit the mixing tank;

the mixing tank, the facilitating and maintaining means, and the outlet defining an open system thereby avoiding subjecting the sulphur dioxide gas to a system pressure;

an absorption tower in communication with the mixing tank into which free floating unreacted sulphur dioxide gas passes from the mixing tank, the absorption tower comprising means for creating a flow of water countercurrent to the flow of sulphur dioxide gas, the tower containing a tortuous maze of pathways through which the water and sulphur dioxide gas will pass in countercurrent flow, and in which sulphur dioxide gas and water come into contact to form sulphurous acid, the absorption tower having an exhaust vent through which sulphur dioxide not reacted in the tower may pass;

a supply of unreacted sulphur dioxide gas conducted in a vent conduit in communication with the exhaust vent and means for drawing the sulphur dioxide gas through the vent conduit;

a supply of water conducted in a supplemental water conduit;

a fourth conduit comprising:
 a blending portion and at least one contact containment portion;
  the blending portion comprising means for bringing the sulphur dioxide gas in the vent conduit and water from the supplemental water conduit into contained, codirectional flow whereby the sulphur dioxide gas and water are brought into contact with each other.
  the contact containment portion(s) comprising a passageway through which the sulphur dioxide gas and the water codirectionally flow in contact with each other and in which at least a portion of the sulphur dioxide gas reacts with the water to form sulphurous acid, and
 means for discharging the sulphurous acid and any unreacted sulphur dioxide gas.

* * * * *